United States Patent
Pavlenko et al.

(10) Patent No.: US 12,406,216 B2
(45) Date of Patent: *Sep. 2, 2025

(54) STORAGE LOCATION SELECTION ACCORDING TO QUERY EVALUATION

(71) Applicant: Uber Technologies, Inc., San Francisco, CA (US)

(72) Inventors: Alexey Pavlenko, Vilnius (LT); Jakob Holdgaard Thomsen, Risskov (DK); Dron Rathore, Aarhus (DK)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,253

(22) Filed: Jun. 13, 2024

(65) Prior Publication Data
US 2024/0330810 A1 Oct. 3, 2024

Related U.S. Application Data

(63) Continuation of application No. 16/805,448, filed on Feb. 28, 2020, now Pat. No. 12,039,474.

(51) Int. Cl.
*G06F 16/00* (2019.01)
*G06F 16/13* (2019.01)
(Continued)

(52) U.S. Cl.
CPC ....... *G06Q 10/06315* (2013.01); *G06F 16/13* (2019.01); *G06F 16/24565* (2019.01); *G06F 16/24578* (2019.01); *G06Q 50/40* (2024.01)

(58) Field of Classification Search
None
See application file for complete search history.

(56) References Cited

U.S. PATENT DOCUMENTS 7,092,977 B2 * 8/2006 Leung ............... G06F 16/13
7,454,446 B2 * 11/2008 Leung ............... G06F 16/185
(Continued)

FOREIGN PATENT DOCUMENTS

| CN | 103377285 A | 10/2013 |
| CN | 103959264 A | 7/2014 |
| JP | 2005-502121 A | 1/2005 |

OTHER PUBLICATIONS

United States Office Action, U.S. Appl. No. 16/805,448, Sep. 20, 2023, 42 pages.
(Continued)

*Primary Examiner* — Jean M Corrielus
(74) *Attorney, Agent, or Firm* — Fenwick & West LLP

(57) ABSTRACT

A method or a system for storing a file from a client device in multiple storage locations based on a placement policy with varied constraints for different copies of the file. The placement policy includes sets of policy constraints for different copies, specifying whether each copy should be uploaded synchronously or asynchronously. For each copy of the file, a specific query is generated based on its associated set of policy constraints. These queries are used to evaluate the attributes of various storage locations, selecting a candidate storage location for each copy. The file copies are then stored at their respective selected locations according to the synchronous or asynchronous upload requirement specified by their respective policy constraints.

20 Claims, 4 Drawing Sheets

(51) Int. Cl.
*G06F 16/2455* (2019.01)
*G06F 16/2457* (2019.01)
*G06Q 10/0631* (2023.01)
*G06Q 50/40* (2024.01)

(56) References Cited

U.S. PATENT DOCUMENTS

| | | | | |
|---|---|---|---|---|
| 7,509,316 B2* | 3/2009 | Greenblatt | | G06F 16/10 |
| | | | | 707/999.102 |
| 8,560,639 B2* | 10/2013 | Murphy | | G06F 16/1844 |
| | | | | 707/610 |
| 8,769,049 B2* | 7/2014 | Murphy | | G06F 11/1464 |
| | | | | 707/637 |
| 8,817,411 B1* | 8/2014 | Sims | | G06F 3/0682 |
| | | | | 711/111 |
| 8,903,764 B2* | 12/2014 | Patil | | G06F 11/1453 |
| | | | | 707/692 |
| 9,002,805 B1* | 4/2015 | Barber | | G06F 16/215 |
| | | | | 707/692 |
| 9,052,826 B2* | 6/2015 | Quan | | G06F 3/0643 |
| 9,053,167 B1* | 6/2015 | Swift | | G06F 16/27 |
| 9,304,867 B2* | 4/2016 | Sivasubramanian | | |
| | | | | G06F 11/1456 |
| 9,384,360 B2* | 7/2016 | Lim | | G06F 16/93 |
| 9,602,424 B1 | 3/2017 | Vincent et al. | | |
| 10,175,914 B2* | 1/2019 | Ross | | G06F 16/173 |
| 10,356,158 B2 | 7/2019 | Crofton et al. | | |
| 10,917,260 B1 | 2/2021 | Bashyam et al. | | |
| 10,956,246 B1 | 3/2021 | Bagde et al. | | |
| 11,386,158 B1 | 7/2022 | Bourbie et al. | | |
| 2002/0055972 A1* | 5/2002 | Weinman, Jr. | | G06F 11/2071 |
| | | | | 709/217 |
| 2003/0046270 A1* | 3/2003 | Leung | | G06F 16/13 |
| 2005/0033757 A1* | 2/2005 | Greenblatt | | G06F 16/10 |
| 2006/0106898 A1 | 5/2006 | Frondozo et al. | | |
| 2007/0038822 A1* | 2/2007 | Correl | | G06F 11/1466 |
| | | | | 711/162 |
| 2007/0083575 A1* | 4/2007 | Leung | | G06F 16/122 |
| 2007/0157287 A1* | 7/2007 | Lim | | G06F 16/13 |
| | | | | 726/1 |
| 2007/0157288 A1 | 7/2007 | Lim | | |
| 2008/0104346 A1* | 5/2008 | Watanabe | | G06F 11/2069 |
| | | | | 711/E12.103 |
| 2008/0104443 A1 | 5/2008 | Akutsu et al. | | |
| 2008/0313416 A1 | 12/2008 | Frondozo et al. | | |
| 2009/0132621 A1 | 5/2009 | Jensen et al. | | |
| 2010/0274762 A1* | 10/2010 | Murphy | | G06F 16/184 |
| | | | | 707/E17.005 |
| 2010/0274983 A1* | 10/2010 | Murphy | | G06F 11/1456 |
| | | | | 711/170 |
| 2011/0167230 A1* | 7/2011 | Quan | | G06F 3/061 |
| | | | | 711/170 |
| 2012/0079221 A1* | 3/2012 | Sivasubramanian | | |
| | | | | G06F 3/0619 |
| | | | | 711/E12.001 |
| 2012/0150925 A1* | 6/2012 | Gupta | | G06F 3/0685 |
| | | | | 707/822 |
| 2012/0173486 A1 | 7/2012 | Park et al. | | |
| 2012/0284229 A1 | 11/2012 | Kim et al. | | |
| 2013/0290274 A1* | 10/2013 | Patil | | G06F 11/1453 |
| | | | | 707/690 |
| 2013/0346537 A1 | 12/2013 | Fitzpatrick et al. | | |
| 2014/0059290 A1* | 2/2014 | Ross | | G06F 3/067 |
| | | | | 711/112 |
| 2015/0169620 A1 | 6/2015 | Schmidt et al. | | |
| 2015/0199367 A1 | 7/2015 | Hammer et al. | | |
| 2015/0278024 A1 | 10/2015 | Barman et al. | | |
| 2015/0278233 A1 | 10/2015 | Ng et al. | | |
| 2016/0078068 A1 | 3/2016 | Agrawal et al. | | |
| 2016/0147465 A1 | 5/2016 | Anglin et al. | | |
| 2017/0060605 A1 | 3/2017 | Huang et al. | | |
| 2017/0287034 A1 | 10/2017 | Barday | | |
| 2018/0337993 A1 | 11/2018 | Kumar Kasturi et al. | | |
| 2019/0384495 A1 | 12/2019 | Balcha | | |
| 2021/0272035 A1* | 9/2021 | Pavlenko | | G06F 16/13 |

OTHER PUBLICATIONS

United States Office Action, U.S. Appl. No. 16/805,448, Feb. 17, 2023, 42 pages.
United States Office Action, U.S. Appl. No. 16/805,448, Aug. 18, 2022, 39 pages.
United States Office Action, U.S. Appl. No. 16/805,448, Dec. 7, 2021, 27 pages.

* cited by examiner

400

Receive, from a client device, a file to be stored in a database according to a placement policy
410

Retrieve one or more policy constraints for a first copy of the file
420

Retrieve one or more storage location constraints and one or more storage location attributes of each storage location
430

Determine a first query for the first copy comprising the policy constraints and the storage location constraints
440

Extract one or more file attributes from the file
450

Determine an attribute set for each storage location including the file attributes and the storage location attributes
460

Identify a first set of candidate storage locations for storage of the first copy by evaluating the attribute sets against the first query
470

Select a first candidate storage location from the first set
480

Provide the first copy of the file to the first candidate storage location for storage
490

FIG. 4

STORAGE LOCATION SELECTION ACCORDING TO QUERY EVALUATION

CROSS REFERENCE TO RELATED APPLICATIONS

This application is a continuation of U.S. application Ser. No. 16/805,448, filed Feb. 28, 2020, which is incorporated by reference in its entirety.

BACKGROUND

This present disclosure generally relates to a data storage architecture for computer-based databases and more specifically to selection of one or more storage locations for storage of data.

Traditional computer-based storage systems manage storage and access of mounds of data. These storage systems typically have finite resources and must consider how to efficiently utilize the resources. Placement policies in place for these storage systems traditionally maintain a hierarchy of storage locations. Storage locations are considered according to the hierarchy to identify an available storage location to store a file. However, these placement policies are not easily adaptable to changes in the storage locations, i.e., adding of storage locations, removing of storage locations, changes in the existing storage locations, etc.

SUMMARY

According to an example, an online storage system stores files or more generally data. The storage system receives files to be stored in a database according to a placement policy. The storage system retrieves policy constraints described in the placement policy. The placement policy may include a plurality of copies to be stored for the file, wherein each copy has one or more policy constraints that constrain selection of storage locations. The storage system retrieves storage location constraints and storage location attributes of each storage location. The storage system determines a query for the first copy comprising the policy constraints for the first copy and the storage location constraints. The storage system extracts file attributes from the file. The file attributes may be file characteristics and/or other characteristics associated with the file. The storage system determines an attribute set for each storage location including the file attributes and the storage location attributes. The storage system identifies a set of candidate storage locations for storage of the first copy by evaluating the attribute sets against the query. The storage system selects a candidate storage location from the first set and provides the first copy of the file to the selected candidate storage location for storage.

In one or more embodiments, the storage system obtains health metrics for each of the storage location. The health metrics may be detected by the storage system through interactions with the storage locations, i.e., storing files, accessing files, etc. The health metrics of a storage location may be used to determine whether the storage location is eligible for selection consideration.

In one or more embodiments, the storage system ranks the candidate storage locations according to one or more ranking metrics. The ranking metrics provide some preference in the selection process. The candidate storage locations all have attribute sets that satisfy the query, yet the ranking preferentially orders the candidate storage locations.

BRIEF DESCRIPTION OF THE DRAWINGS

FIG. 4 illustrates a process flowchart for storing a file according to a placement policy, in accordance with one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
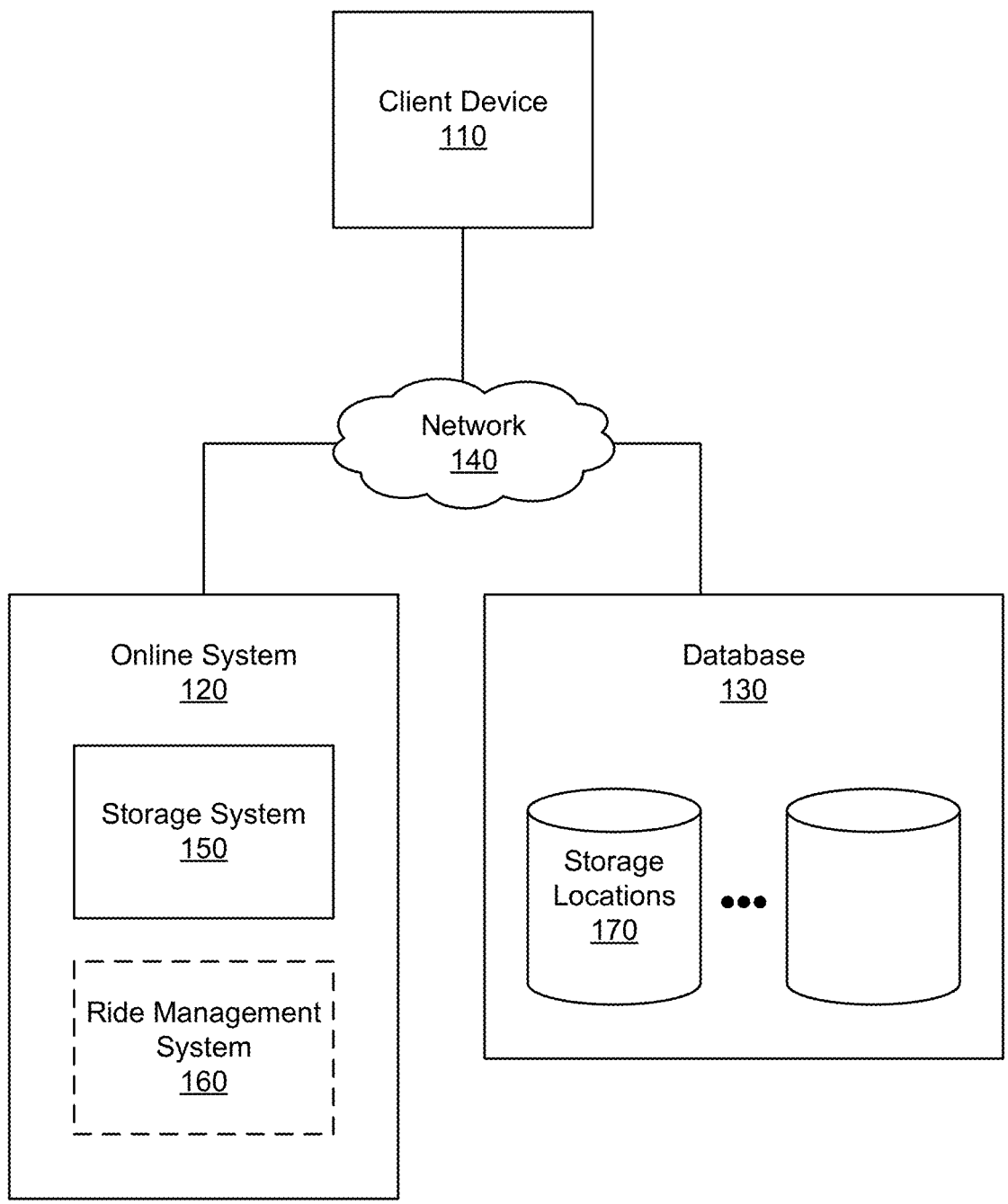
FIG. 1 illustrates a networking environment for an online storage system, in accordance with one or more embodiments.

FIG. 1 illustrates networking environment for an online storage system, in accordance with one or more embodiments. FIG. 1 includes a client device 110, an online system 120, a database 130, and a network 140. The online system 120 includes a storage system 150 that stores data or files (e.g., data objects, blobs, documents, etc.) obtained by the online system 120. In some embodiments, the online system 120 is a transport service system that connects riders and drivers for transport service transactions. The online system 120, in these embodiments, may also include a ride management system 160 that manages one or more aspects of the transport service transactions. For clarity, only one client device 110 is shown in FIG. 1, but in reality, multiple client devices 110 may communicate with any component over the network 140. Alternate embodiments of the system environment 100 can have any number online systems 120 and databases 130. The functions performed by the various entities of FIG. 1 may also vary in different embodiments.

Users interact with the online system 120 through client device 110. The client device 110 can be personal or mobile computing devices, such as smartphones, tablets, or notebook computers. The client device 110 may interact with the online system 120 through client applications configured to interact with the online system 120. Interactions include at least storing data or files to the online system 120, providing instructions regarding storage of the files by the online system 120, viewing files stored by the online system 120, accessing files stored by the online system 120, other interactions for file or data management, or any combination thereof. Files that are provided to the online system 120 may include text files, spreadsheets, photos, videos, data objects, other file types, or any combination thereof.

In embodiments of the online system 120 as a transport service system, users and drivers may interact with the client applications of the client devices 110 to request and access information about rides arranged. The client applications can present information received from the transport service system on a user interface, such as a map of the geographic region, the estimated trip duration, and other information. Additionally, the client devices 110 may provide their location and other data to the transport service system. For example, a current location of a client device 110 may be designated by a user or driver or detected using a location sensor of the client device (e.g., a global positioning system (GPS) receiver) and provided to the transport service system as coordinates. Some or all of the information—i.e., as files—regarding the ridesharing transactions may be provided to the online system 120 for storage.

The online system 120 stores files, e.g., via the storage system 150. The storage system 150 obtains files, e.g., from one or more client devices 110, to be stored. The storage system 150 stores the files in one or more storage locations 170 of the database 130. The storage system 150 may be distributed over a plurality of servers, wherein each server may have server attributes. Example server attributes include, a geographical region where the server is deployed, whether the server is in a staging state (i.e., a state where the server handling file storage and retrieval is undergoing tests) or a production state (i.e., a state where the server is live with runtime file storage). The storage system 150 may have one or more global constraints (e.g., in effect for all files stored by the storage system 150). A global constraint constrains which storage locations are selected. For example, a global constraint may indicate read-write accessibility with the storage location. In one or more embodiments, the storage system 150 stores files according to a placement policy (e.g., selected from a plurality of placement policies). A placement policy includes one or more policy constraints that constrain selection of storage locations for storage of files. The placement policy may also include one or more placement criteria that dictate placement of the file. The placement criteria may include any combination of a number of copies to store for the file, whether storage of a copy is mandatory or optional, a date and/or time when to store the file, a minimum health metric for storage locations to be eligible for selection consideration (e.g., remaining capacity), one or more ranking metrics for use in ranking candidate storage locations, synchronous or asynchronous upload-wherein a synchronous upload stores the file in the selected storage location temporally proximate to the upload time, whereas an asynchronous upload stores the file as a background operation not necessarily temporally proximate to the upload time, etc.

The storage system 150 selects storage locations to store copies of files. The storage system 150 generates an attribute set for each eligible storage location. The attribute set includes at least file attributes and storage location attributes. The file attributes are characteristics of the file, wherein storage location attributes are properties of the storage location. The attribute set may include additional attributes, e.g., one or more attributes of the storage system 150, one or more attributes of a server of the storage system 150 handling the upload request, other attributes described herein this disclosure, etc. The storage system 150 generates a query according to the placement policy. Each eligible storage location 170 may also include one or more storage location constraints which constrain what files may be stored at the particular storage location. The query generated is a combination of global constraints, storage location constraints, and policy constraints. The attribute for each storage location is evaluated against the query to determine candidate storage locations that are eligible for use in storing the file. The storage system 150 may further rank the candidate storage locations according to a ranking metric. The storage system 150 selects one or more of the candidate storage locations and stores a copy of the file to the selected candidate storage location. In one or more embodiments, the storage system 150 obtains health metrics for each storage location. Storage locations having a poor health metric may be excluded from selection consideration. The storage system 150 will be further described in FIGS. 2-4.

Selection of storage locations using attribute sets evaluated against queries to determine candidate storage locations provides greater flexibility in a placement policy. Due to the placement policy being agnostic of storage location, i.e., comprising policy constraints, there is no restriction to referring directly to storage locations. This agnosticism proves useful in situations when various storage locations are added, removed, or changed in some manner as the placement policy need not be rewritten to accommodate these various changes. For example, if a particular storage location has crashed (is in an off state), the placement policy as described herein can continue selection consideration with the remaining storage locations. Traditional placement policies dependent on particular storage locations would need to outline contingencies for every possible scenario. This placement policy allows for scalability as well. As more storage locations are added to the database 130, the placement policies being agnostic to storage location can consider the newly added storage locations with the current storage locations.

In some embodiments, a ride management system 160 manages rideshare transactions. In managing rideshare transactions, the ride management system 160 may implement various algorithms for connecting riders and drivers. Each trip (e.g., a transport service that is requested and/or completed) can be logged, e.g., recording a date of the trip, a time of the trip, route data for a route traveled, a rider identifier, a driver identifier, a calculated cost for the trip, payment received, discount codes used, any delays, any excess fees, any notes, ratings, other trip information, etc. The ride management system 160 may provide information for a trip all at once or as each piece of information is received or calculated.

The database 130 stores files. The database 130 receives file from the online system 120, or more specifically the storage system 150. The database 130 stores the data comprised in a file. The database 130 comprises a plurality of storage locations 170. One or more external systems may operate one or more of the storage locations 170. For example, a first external system manages three storage locations with a second external system managing another one storage location. In any case, the database 130 may be networked to the online system 120 or directly communicative with the online system 120.

The storage locations 170 are selected by the storage system 150 to store copies of files. In some embodiments, a storage location 170 is a physical disk storage that comprises various components and subcomponents relating to physical disk storage. In other embodiments, a storage location 170 is an online storage, e.g., an online cloud storage. Storage locations have one or more storage location attributes and may also have one or more storage location constraints.

The storage location attributes help to define the storage location. For example, a storage location attribute defines the technology of the storage location (s3, hdfs, glacier, etc.). As another example, a storage location attributes indicates accessibility of files stored, e.g., read only or read-write. Other storage location attributes include a geographical region of the storage location 170, an accessibility speed of accessing stored files, a remuneration for storage of a file, etc.

Storage location constraints constrain what files may be stored at the particular storage location. For example, a storage location constraint constrains that files need to be greater than a size of 50 megabytes (mb) to be stored in a particular storage location. Other embodiments of storage location constraints may include any type of restrictions against various attributes of files, e.g., a storage location constraint excludes storage of files containing sensitive information. Another embodiment of storage location constraint constrains context of the uploaded file. In a first example, a storage location constraint permits only a specific group of one or more client devices that may store files at the respective storage location. In another example, a storage location constrains based on a geographical location of a server of the storage system 150 that receives the request to upload a file (e.g., only United States based storage systems 150 can upload to a particular storage location). The storage location attributes and the storage location constraints may be provided to the storage system 150 for use in selection consideration.

The various components of the system environment 100 communicate via one or more network interfaces to communicate over the network 140. The network 140 comprises any combination of local area and wide area networks employing wired or wireless communication links. In some embodiments, all or some of the communication on the network 140 may be encrypted. For example, data encryption may be implemented in situations where the database 130 is located on a third-party online system separate from the online system 120.

Storage System Architecture

Figure 2:
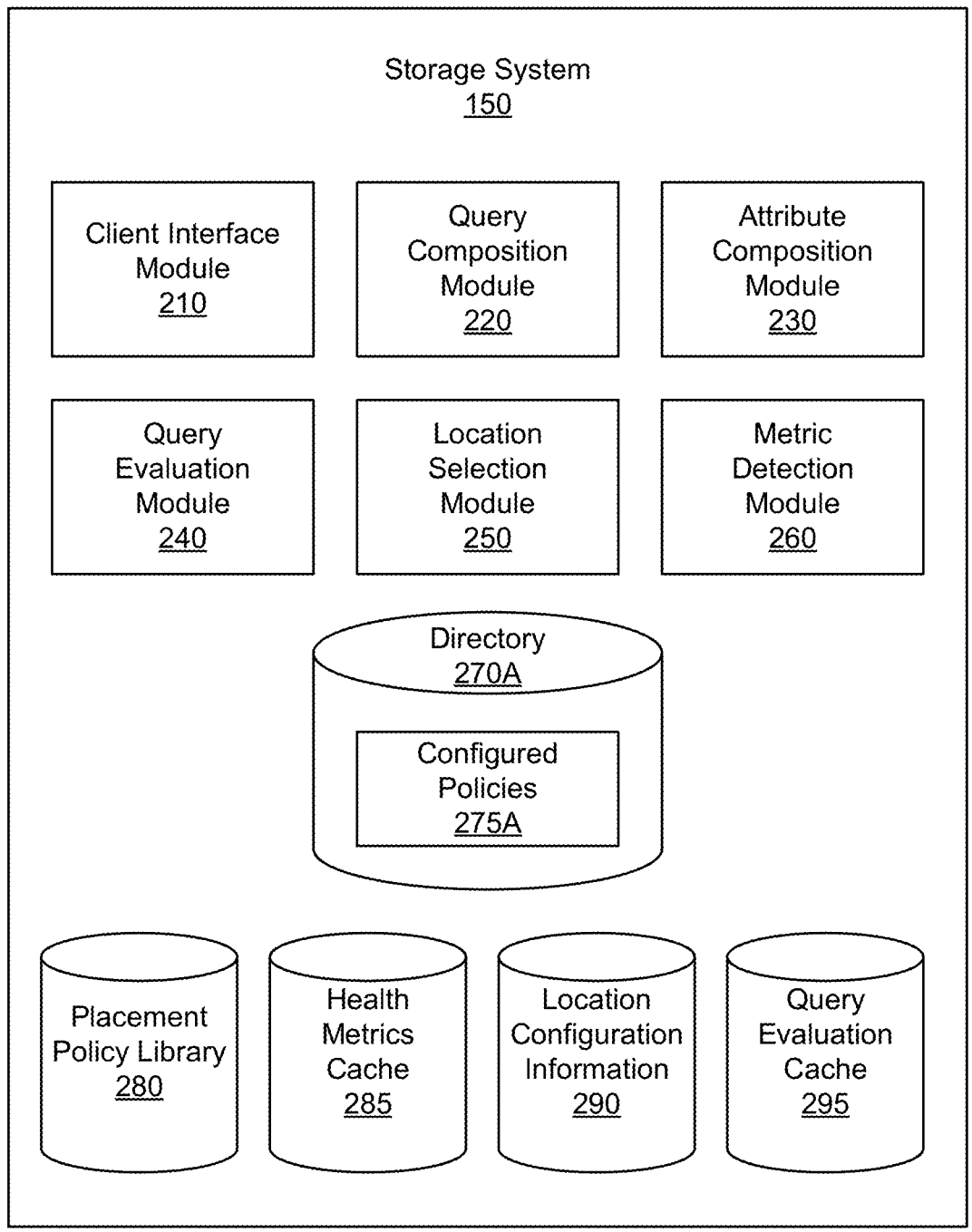
FIG. 2 illustrates an exemplary architecture of the online storage system, in accordance with one or more embodiments.

FIG. 2 illustrates an exemplary architecture of the online storage system 150, in accordance with one or more embodiments. The storage system 150 stores files received by the online system 120. The storage system 150 selects one or more storage locations 170 and stores files at the selected storage locations. The storage system 150 has, among other components, a client interface module 210, query composition module 220, an attribute composition module 230, a query evaluation module 240, a location selection module 250, a metric detection module 260, at least one directory 270A, a placement policy library 280, a health metrics cache 285, location configuration information 290, and a query evaluation cache 295. In other embodiments, the storage system 150 has additional or fewer components than those listed herein; moreover, the functions and operations of the various modules may also be interchanged amongst the modules. In embodiments not illustrated, the storage system 150 has a file retrieval module that retrieves files from the storage locations 170, e.g., in response to requests for the file data.

The client interface module 210 moderates communication between the storage 150 and one or more client devices 110. The client interface module 210 receives files and responds to requests from the client device 110. The files are typically provided by the client device 110 for storage by the storage system 150. Files may be any computer-readable file of any various file type. The file may be named, comprise file data, and other metadata properties. Metadata properties include size, file type, etc. In response to a client device 110 requesting access to files, the client interface module 210 distributes requested information to the client device 110. In some instances, the information is presented in a GUI to the client device 110.

The query composition module 220 generates one or more queries for use in selection of storage locations for use in storage of a file. The query composition module 220 generates a query with one or more global constraints, one or more storage location constraints, and one or more policy constraints, or any combination thereof. In some embodiments, the query generated is evaluated according to Boolean logic, wherein operators are used to combine the constraints in the query. The basic operators of Boolean logic include "AND", "OR", and "NOT" which are used to combine constraints in the query and determine how the constraints are satisfied during query evaluation. The "AND" operator combines two expressions such that both expressions need to be satisfied in order to resolve as true. The "OR" operator combines two expressions such that at least one of the two expressions need to be satisfied to resolve as true. The "NOT" operator inverses the resolution of an expression, e.g., from "false" to "true" and vice versa. Other more complicated operators may also be implemented in query composition. Other logics that may be implemented include first-order logic and other higher-order logics. Query languages that may be used include Structured Query Language (SQL), Object Query Language (OQL), Embedded SQL, Prolog, Datalog, other declarative logic programming languages, etc.

In one or more embodiments, a placement policy in effect indicates some number of copies of the file to be stored. Each copy specified by the placement policy may comprise individualized policy constraints used for selection of a storage location for storage of that copy. The query composition module 220 generates a query for each copy of the file to be stored. Accordingly, the storage system 150 selects a candidate storage location for each copy from the evaluation of the query for that copy.

The attribute composition module 230 generates an attribute set for each storage location eligible for selection consideration. The attribute composition module 230 generates an attribute set including one or more file attributes and one or more storage location attributes. The file attributes includes characteristics of the file. Example file attributes include a size of the file, a file type of the file, an uploading client device 110 that provided the file for storage, a geographical region where an uploading client device 110 provided the file for storage, a time of receipt of the file for storage, a sensitivity of data in the file, another known property of the file, etc. The file attributes are obtained from the file provided for storage. As mentioned above, storage location attributes help to define the storage location, e.g., technology of the storage location, a geographical region where the storage location is located, an accessibility of the storage location. The storage location attributes may be obtained from the storage locations 170 or may be recorded locally under location configuration information 290.

In some embodiments, eligible storage locations are storage locations that have one or more health metrics above one or more thresholds. Eligible storage locations may be some or all of the storage locations 170 in the database 130. For example, a success rate of storing a file above 95% is the determining factor as to whether a storage location is eligible for consideration. In an example with two health metrics, both health metrics of a storage location need to satisfy respective thresholds to be deemed eligible for selection consideration. In particular, this can be exampled with a storage location needing to have a success rate above 95% and a capacity rate below 50% in order to be deemed eligible. Accordingly, in embodiments with health metrics measured discretely (e.g., a storage location has an on state and an off state), eligibility may be achieved by having the appropriate discrete measure (e.g., the storage location needs to be in the on state to be eligible). In other embodiments, health metrics may also be considered as storage location attributes. As storage location attributes, the health metrics may be included in attribute sets generated for storage locations in selection consideration.

The query evaluation module 240 evaluates queries against attribute sets. The query evaluation module 240 evaluates a query against an attribute set according to the query logic. Accordingly, if the attribute set satisfies the query, the attribute set is evaluated to be true. In an example with Boolean logic, an attribute set satisfies a query with a number of constraints conjoined with the "AND" operator, if the attribute set includes at least one attribute that satisfies each of the constraints in the query. The attribute sets that satisfy a query are provided to the location selection module 250. If N copies of a file are to be stored (as indicated by a placement policy) and considering M available storage locations, the query evaluation module 240 evaluates N×M evaluations. In one or more embodiments, the query evaluation module 240 caches one or more query evaluations in the query evaluation cache 295. Cached query evaluations may be retrieved and used in evaluating subsequent queries.

The location selection module 250 selects a storage location and stores a copy of the file at the selected storage location. The location selection module 250 receives the query evaluations from the query evaluation module 240. For a query, the location selection module 250 designates storage locations with attribute sets that satisfy the query as candidate storage locations. The location selection module 250 selects one of the candidate storage locations. The location selection module 250 stores a copy of the file to the selected candidate storage location. In some embodiments, the location selection module 250 may perform other processes prior to storage of the copy of the file, e.g., name hashing, file encryption, setting accessibility settings (e.g., password, particular client devices 110 that are allowed to access, etc.).

In one or more embodiments, the location selection module 250 refers to one or more ranking metrics in a placement policy for use in selecting the candidate storage location. For example, the ranking metric specifies ranking the candidate storage locations according to remuneration for storing a file. The location selection module 250 selects from the ranking the candidate storage location with the lowest remuneration for storing a file. In another example, the ranking metric specifies ranking the candidate storage locations according to proximity to the geographical region of the uploading client device 110. The location selection module 250 may select from the ranking the candidate storage location in closest proximity to the geographical region of the uploading client device 110. In additional embodiments, multiple ranking metrics are considered in tandem, wherein the location selection module 250 can rank according to a function of the multiple ranking metrics. For example, the function weights the influence of each ranking metric to generate an overall rank score for each candidate storage location.

The metric detection module 260 detects health metrics for one or more of the storage locations 170. The metric detection module 260 may send requests (e.g., periodically) to each storage location 170 to provide various health metrics. For example, the metric detection module 260 may obtain a capacity of a storage location 170 as a health metric for the storage location 170. The metric detection module 260 may also detect health metrics as files are provided for storage to the storage locations 170. For example, the metric detection module 260 records a success or failure rate in storing files at a particular storage location 170 as one health metric. Another health metric may be retrieval success or failure rate. Other health metrics may be measured as relative latency in individual operations with the storage location, e.g., storage, retrieval, editing, etc.

The directory 270A is used by the storage system 150 to organize files stored by the storage system 150. The directory 270A has configured policies 275A put in place dictating operation of the directory 270A. The configured policies 275A includes a placement policy, e.g., selected from various placement policies stored under the placement policy library 280. Each placement policy includes its own policy constraints. Other configured policies may include an indexing policy that dictates how files stored under the directory 270A are indexed, an encryption policy that dictates how file data is encrypted, a retention policy that dictates circumstances in which files are deleted (e.g., files last accessed more than a year ago are deleted), etc. In additional embodiments, the storage system 150 comprises a plurality of directories 270 that may be arranged in a nested hierarchy. In embodiments with a nested hierarchy of directories, a child directory (nested under a parent directory) may inherit its parent directory's configured policies absent configured policies in place for the child directory.

Figure 3:
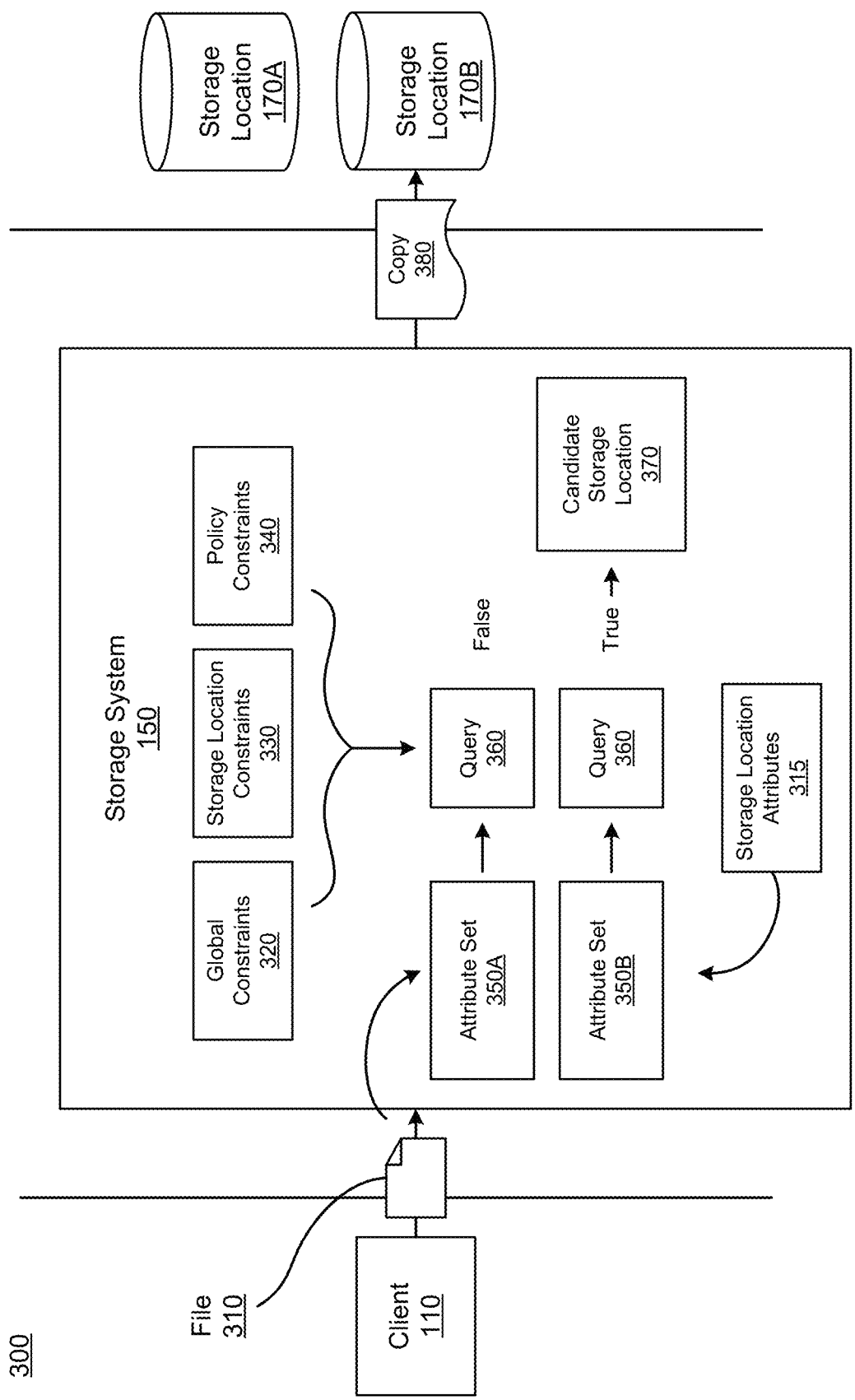
FIG. 3 illustrates a flow of files when stored by the online storage system, in accordance with one or more embodiments.

FIG. 3 illustrates a flow 300 of a file during storage by the online storage system 150, in accordance with one or more embodiments. In this illustration, there is one uploading client device 110. The storage system 150 is a component of the online system 120. In addition, there are two storage locations 170A and 170B, embodiments of storage locations 170.

The uploading client device 110 provides a file to the storage system 150 for storage. The file 310 may be provided in a batch of other files. The file 310 has one or more file attributes that describe characteristics of the file. The storage system 150 receives the file 310. The uploading client device 110 may specify a directory to store the file under. Accordingly, the storage system 150 retrieves configured policies for the specified directory.

The storage system 150 generates an attribute set for each eligible storage location, namely attribute set 350A for storage location 170A and attribute set 350B for storage location 170B. The attribute set includes one or more file attributes, one or more storage location attributes 315, or any combination thereof. As described above, storage locations may be determined to be eligible with one or more health metrics above certain thresholds.

The storage system 150 generates a query 360 for one copy of the file. The query 360 generated includes one or more global constraints 320, one or more storage location constraints 330, one or more policy constraints 340, or any combination thereof. The policy constraints 340 are retrieved from the placement policy in effect, e.g., set in place for the specified directory.

The storage system 150 evaluates each attribute set 350A and 350B against the query 360. Storage locations with attribute sets evaluated to satisfy the query 360 are deemed to be candidate storage locations. In the example shown in FIG. 3, the attribute set 350A does not satisfy the query 360 and the query evaluation renders "false", while the attribute set 350B does satisfy the query 360 such that the query evaluation is "true". The storage location 170B is deemed a candidate storage location 370. In this example with only storage location 170B as the candidate storage location 370, the storage system 150 provides a copy 380 of the file 310 to the storage location 170B for storage. In some instances, no eligible storage location has an attribute set that satisfies the query 360 for a mandatory copy. These instances may arise if a placement policy is overly strict or if eligible storage locations are limited. In these instances, an error message may be sent back to the uploading client 110 indicating failure to effectively place a mandatory copy according to the placement policy. The error message may indicate which constraints in the query 360 were unsatisfied.

Placement Selection and Storing Files

FIG. 4 illustrates a process flowchart 400 for storing a file according to a placement policy, in accordance with one or more embodiments. The following steps are in the perspective of the storage system 150, but can be performed by the various modules in the storage system 150 shown in FIG. 2. In other embodiments, the storage system 150 may perform additional or fewer operations that those listed herein.

The storage system 150 receives 410, from a client device 110, a file to be stored in a database 130 according to a placement policy. The placement policy may be selected from a library of placement policies. Each placement policy comprises a plurality of policy constraints that dictate how many copies of the file are stored and aid in selection of the storage location to store each of the copies. The database 130 selects from a plurality of storage locations 170 for storing files, as described in FIG. 1. Each file comprises various characteristics, e.g., a name of the file, file data, various properties of the file, a file type, etc. Moreover, other metadata properties may be associated with the file, such as, the uploading client, the geographical region of the uploading client, etc.

The storage system 150 retrieves 420 one or more policy constraints for a first copy of the file described in the placement policy. The placement policy may include a plurality of copies to be stored for the file, wherein each copy has one or more policy constraints that constrain selection of storage locations. Example policy constraints include constraining a particular geographical region, constraining a particular storage technology, constraining for a particular accessibility, etc.

The storage system 150 retrieves 430 one or more storage location constraints and one or more storage location attributes of each storage location of the plurality of storage locations. Each storage location has a set of storage location attributes that define the storage location. Storage location attributes include an accessibility (e.g., read only or read-write), a storage technology, a remuneration cost, etc. Storage location constraints may constrain what files may be stored in the storage location. Example storage location constraints include a minimum file size, a particular file type, etc. In some embodiments, some or all of the storage locations are absent storage location constraints.

The storage system 150 determines 440 a first query for the first copy comprising the policy constraints for the first copy and the storage location constraints. The first query is combines the various constraints. In some embodiments, the first query is a Boolean query wherein the constraints are combined with the "AND" operator. In embodiments with additional copies to be stored as defined in the placement policy, the storage system 150 determines a distinct query for each copy including policy constraints specified for that copy.

The storage system 150 extracts 450 one or more file attributes from the file. The file attributes may be file characteristics and/or other characteristics associated with the file.

The storage system 150 determines 460 an attribute set for each storage location including the file attributes and the storage location attributes. The attribute sets are a list of the file attributes and the storage location attributes. In some embodiments, an attribute set is generated for eligible storage locations. Eligibility in selection consideration may be determined according to one or more health metrics for the storage locations. The eligibility for a storage location may be evaluated based on whether the health metrics for the storage location are above a certain threshold.

The storage system 150 identifies 470 a first set of candidate storage locations for storage of the first copy by evaluating the attribute sets against the first query. The storage system 150 evaluates an attribute set against a query by evaluating whether the list of attributes in the attribute set satisfies the query. In an example of a Boolean query with all constraints combined with the "AND" operator, the storage system 150 evaluates whether each constraint is satisfied by at least one attribute of the attribute set. For example, if a policy constraint in the first query is "loc:tech:s3" constraining storage technology, then a storage location attribute of "loc:tech:s3" describing the storage location's storage technology satisfies that policy constraint. In examples with other operators, the storage system 150 evaluates whether the attribute set sufficiently evaluates "true" for the query. In embodiments where the placement policy includes additional copies, the storage system 150 evaluates the attribute set for each storage location against the query for each copy.

The storage system 150 selects 480 a first candidate storage location from the first set. The storage system 150 may rank the first set of candidate storage locations according to one or more ranking metrics. From the ranking, the storage system 150 selects the highest ranked candidate storage location for use in storing the first copy of the file.

The storage system 150 provides 490 the first copy of the file to the first candidate storage location for storage. The storage system 150, upon storing the first copy, can detect one or more health metrics of the storage location. For example, depending on whether the storage of the first copy was successful or not, the storage system 150 may detect an average success rate in storing files at the storage location. In other embodiments, the storage system 150 may also obtain health metrics detected by the storage location. For example, the storage location provides a capacity of the storage location as a health metric to the storage system 150.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
    receiving, from a client device, a request for storing a file in a directory;
    retrieving, from a placement policy library, a placement policy associated with the directory, the placement policy specifying:
        a plurality of copies to be stored, and
        a set of policy constraints for each of the plurality of copies, the set of policy constraints including
            (1) an attribute set of storage location to which a corresponding copy is to be stored; and
            (2) required upload mode selected from synchronous or asynchronous, wherein the policy constraints for the plurality of copies include a first set of policy constraints associated with a first copy of the plurality of copies of the file, and a second set of policy constraints associated with a second copy of the plurality of copies of the file, and wherein the first or second set of policy constraints specify (1) an attribute set of storage to which the respective first or second copy of file is to be stored, and (2) whether the respective first or second copy of file is uploaded using a synchronous or asynchronous upload, and wherein a synchronous upload stores the file temporarily proximate to an update time, and an asynchronous upload stores the file as a background operation;
    determining a current attribute set for each of a plurality of storage locations;
    generating a data structure storing current attribute sets of the plurality of storage locations;
    determining a first query in a structured query language for the first copy of the file, the first query comprising the first set of policy constraints for the first copy;
    executing the first query against the data structure storing the current attribute sets for storage locations to identify a first set of one or more candidate storage locations for storage of the first copy based on evaluation of the current attribute sets of the plurality of storage locations against the first query;
    selecting a first candidate storage location from the first set of one or more candidate storage locations for storage of the first copy;
    providing the first copy of the file to the first candidate storage location for storage;
    determining a second query in a structured query language for the second copy comprising the second set of policy constraints for the second copy;
    executing the second query against the data structure storing the current attribute sets for storage locations to identify a second set of one or more candidate storage locations for storage of the second copy based on evaluation of the current attribute sets of the plurality of storage locations against the second query;
    selecting a second candidate storage location from the second set of one or more candidate storage locations for storage of the second copy; and
    providing the second copy of the file to the second candidate storage location for storage.

2. The method of claim 1, wherein identifying the first set of one or more candidate storage locations for storage of the first copy by executing the first query against the data structure storing the current attribute sets comprises:
    for each storage location of the plurality of storage locations, determining whether the current attribute set satisfies the first query,
    wherein the first set of one or more candidate storage locations include storage locations whose current attribute set satisfy the first query.

3. The method of claim 1, further comprising:
    obtaining one or more health metrics for each storage location of the plurality of storage locations, and
    selecting the first candidate storage location or the second candidate storage location further based on the health metrics of the plurality of storage locations.

4. The method of claim 3, wherein a storage location is excluded from the plurality of storage locations if the first health metric of the storage location is below a threshold.

5. The method of claim 3, wherein the one or more health metrics of a storage location comprise at least one of: a success rate, a failure rate, a capacity usage rate, or a relative latency in individual operations with the storage location.

6. The method of claim 1, further comprising:
    receiving an input to adjust the placement policy; and
    responsive to the input, adjusting one or more policy constraints described in the placement policy.

7. The method of claim 1, wherein the file is associated with one or more file attributes, and the plurality of policy constraints are associated with the one or more file attributes.

8. The method of claim 7, wherein the one or more file attributes comprise at least one of: file size, file type, or geographical origin of the uploading client device.

9. A non-transitory computer-readable storage medium storing instructions that, when executed by one or more processors, cause the one or more processor to perform operations comprising:
receiving, from a client device, a request for storing a file to be storedin a directory;
retrieving, from a placement policy library, a placement policy associated with the directory, the placement policy specifying:
a plurality of copies to be stored, and
a set of policy constraints for each of the plurality of copies, the set of policy constraints including
(1) an attribute set of storage location to which a corresponding copy is to be stored; and
(2) required upload mode selected from synchronous or asynchronous, wherein the policy constraints for the plurality of copies include a first set of policy constraints associated with a first copy of the plurality of copies of the file, and a second set of policy constraints associated with a second copy of the plurality of copies of the file, and wherein the first or second set of policy constraints specify (1) an attribute set of storage to which the respective first or second copy of file is to be stored, and (2) whether the respective first or second copy of file is uploaded using a synchronous or asynchronous upload, and wherein a synchronous upload stores the file temporarily proximate to an update time, and an asynchronous upload stores the file as a background operation;
determining a current attribute set for each of a plurality of storage locations;
generating a data structure storing current attribute sets of the plurality of storage locations;
determining a first query in a structured query language for the first copy of the file, the first query comprising the first set of policy constraints for the first copy;
executing the first query against the data structure storing the current attribute sets for storage locations to identify a first set of one or more candidate storage locations for storage of the first copy based on evaluation of the current attribute sets of the plurality of storage locations against the first query;
selecting a first candidate storage location from the first set of one or more candidate storage locations for storage of the first copy;
providing the first copy of the file to the first candidate storage location for storage;
determining a second query in a structured query language for the second copy comprising the second set of policy constraints for the second copy;
executing the second query against the data structure storing the current attribute sets for storage locations to identify a second set of one or more candidate storage locations for storage of the second copy based on evaluation of the current attribute sets of the plurality of storage locations against the second query;
selecting a second candidate storage location from the second set of one or more candidate storage locations for storage of the second copy; and
providing the second copy of the file to the second candidate storage location for storage.

10. The non-transitory computer-readable storage medium of claim 9, wherein identifying the first set of one or more candidate storage locations for storage of the first copy by executing the first query against the data structure storing the current attribute sets comprises:
for each storage location of the plurality of storage locations, determining whether the current attribute set satisfies the first query,
wherein the first set of one or more candidate storage locations include storage locations whose current attribute set satisfy the first query.

11. The non-transitory computer-readable storage medium of claim 9, wherein the instructions further cause the one or more processors to:
obtaining one or more health metrics for each storage location of the plurality of storage locations, and
selecting the first candidate storage location or the second candidate storage location further based on the health metrics of the plurality of storage locations.

12. The non-transitory computer-readable storage medium of claim 11, wherein a storage location is excluded from the plurality of storage locations if the first health metric of the storage location is below a threshold.

13. The non-transitory computer-readable storage medium of claim 11, wherein the one or more health metrics of a storage location comprise at least one of: a success rate, a failure rate, a capacity usage rate, or a relative latency in individual operations with the storage location.

14. The non-transitory computer-readable storage medium of claim 9, wherein the instructions further cause the one or more processors to:
receive an input to adjust the placement policy; and
responsive to the input, adjust one or more policy constraints described in the placement policy.

15. The non-transitory computer-readable storage medium of claim 9, wherein the file is associated with one or more file attributes, and the plurality of policy constraints are associated with the one or more file attributes.

16. The non-transitory computer-readable storage medium of claim 15, wherein the one or more file attributes comprise at least one of: file size, file type, or geographical origin of the uploading client device.

17. A computer system comprising:
one or more processors; and
a non-transitory computer-readable storage medium storing instructions that, when executed by the one or more processors, cause the one or more processors to perform operations comprising:
receiving, from a client device, a request for storing a file in a directory;
retrieving, from a placement policy library, a placement policy associated with the directory, the placement policy specifying:
a plurality of copies to be stored, and
a set of policy constraints for each of the plurality of copies, the set of policy constraints including
(1) an attribute set of storage location to which a corresponding copy is to be stored; and
(2) required upload mode selected from synchronous or asynchronous, wherein the policy constraints for the plurality of copies include a first set of policy constraints associated with a first copy of the plurality of copies of the file, and a second set of policy constraints associated with a second copy of the plurality of copies of the file, and wherein the first or second set of policy constraints specify (1) an attribute set of storage to which the respective first or second copy of file is to be stored, and (2) whether the respective first or second copy of file is uploaded using a synchronous or asynchronous upload, and wherein a synchronous upload stores the file temporarily proximate to an update time, and an asynchronous upload stores the file as a background operation;
determining a current attribute set for each of a plurality of storage locations;
generating a data structure storing current attribute sets of the plurality of storage locations;
determining a first query in a structured query language for the first copy of the file, the first query comprising the first set of policy constraints for the first copy;
executing the first query against the data structure storing the current attribute sets for storage locations to identify a first set of one or more candidate storage locations for storage of the first copy based on evaluation of the current attribute sets of the plurality of storage locations against the first query;
selecting a first candidate storage location from the first set of one or more candidate storage locations for storage of the first copy;
providing the first copy of the file to the first candidate storage location for storage;
determining a second query in a structured query language for the second copy comprising the second set of policy constraints for the second copy;
executing the second query against the data structure storing the current attribute sets for storage locations to identify a second set of one or more candidate storage locations for storage of the second copy based on the evaluation of the current attribute sets of the plurality of storage locations against the second query;
selecting a second candidate storage location from the second set of one or more candidate storage locations for storage of the second copy; and
providing the second copy of the file to the second candidate storage location for storage.

18. The computer system of claim 17, wherein identifying the first set of one or more candidate storage locations for storage of the first copy by executing the first query against the data structure storing the current attribute sets comprises:
for each storage location of the plurality of storage locations, determining whether the current attribute set satisfies the first query,
wherein the first set of one or more candidate storage locations include storage locations whose current attribute set satisfy the first query.

19. The computer system of claim 17, wherein the one or more processors are further caused to:
obtain one or more health metrics for each storage location of the plurality of storage locations, and
select the first candidate storage location or the second candidate storage location further based on the health metrics of the plurality of storage locations.

20. The computer system of claim 19, wherein the one or more health metrics of a storage location comprise at least one of: a success rate, a failure rate, a capacity usage rate, or a relative latency in individual operations with the storage location.

* * * * *

UNITED STATES PATENT AND TRADEMARK OFFICE
CERTIFICATE OF CORRECTION

| | | |
|---|---|---|
| PATENT NO. | : 12,406,216 B2 | Page 1 of 1 |
| APPLICATION NO. | : 18/742253 | |
| DATED | : September 2, 2025 | |
| INVENTOR(S) | : Pavlenko et al. | |

It is certified that error appears in the above-identified patent and that said Letters Patent is hereby corrected as shown below:

In the Claims

In Column 13, in Claim 9, Line 6, delete "to be storedin" and insert -- in --, therefor.

In Column 15, in Claim 17, Line 28, after "based on" delete "the".

Signed and Sealed this
Twenty-first Day of October, 2025

John A. Squires
*Director of the United States Patent and Trademark Office*